(12) United States Patent
Lerner

(10) Patent No.: US 10,154,015 B1
(45) Date of Patent: Dec. 11, 2018

(54) EXECUTABLE CODED CIPHER KEYS

(71) Applicant: Daniel Maurice Lerner, Missouri City, TX (US)

(72) Inventor: Daniel Maurice Lerner, Missouri City, TX (US)

(73) Assignee: IRONCLAD ENCRYPTION CORPORATION, Houston, TX (US)

( * ) Notice: Subject to any disclaimer, the term of this patent is extended or adjusted under 35 U.S.C. 154(b) by 0 days.

(21) Appl. No.: 16/005,968

(22) Filed: Jun. 12, 2018

Related U.S. Application Data (63) Continuation-in-part of application No. 16/005,918, filed on Jun. 12, 2018, and a continuation-in-part of
(Continued)

(51) Int. Cl.
*H04L 29/06* (2006.01)
*H04L 9/12* (2006.01)
(Continued)

(52) U.S. Cl.
CPC ...... *H04L 63/0457* (2013.01); *G06F 12/1441* (2013.01); *G06F 21/76* (2013.01);
(Continued)

(58) Field of Classification Search
CPC .................................................. H04L 63/0457
See application file for complete search history.

(56) References Cited

U.S. PATENT DOCUMENTS 4,558,176 A * 12/1985 Arnold .................... G06F 21/10
380/29

4,578,530 A    3/1986 Zeidler
(Continued)

FOREIGN PATENT DOCUMENTS

EP        3161718 A1    5/2017
WO    2016173724 A1   11/2016

OTHER PUBLICATIONS

Rafaeli et al.; A survey of key management for secure group communication; Published in: Journal ACM Computing Surveys (CSUR) Surveys Homepage archive; vol. 35 Issue 3, Sep. 2003; ACM Digital Library (Year: 2003).*
(Continued)

*Primary Examiner* — Bradley Holder
(74) *Attorney, Agent, or Firm* — Guerry L. Grune; ePatentManager.com (57) ABSTRACT

The disclosure provides for two or more devices that securitize transmission(s) transmitted to and received from these devices comprising at least one executable coded cipher key(s), at least one executable coded encryption key (ECEK) device that encrypts transmission(s) that uses executable cipher coded key(s), and at least one executable coded decryption key (ECDK) device that decrypts transmission(s) and that also uses at least one executable coded cipher key(s), such that transmission(s) are sent to an encrypter/decrypter memory that stores transmission(s) while the transmission(s) is encrypted and/or decrypted. When encryption/decryption is completed, the transmission(s) is sent to at least one transmitter such that encryption/decryption of the transmission(s) is controlled and manipulated by the executable coded cipher key(s), wherein the executable coded cipher key(s) remain in the computer memory long enough to achieve encryption/decryption completion.

29 Claims, 4 Drawing Sheets

Related U.S. Application Data application No. 16/005,871, filed on Jun. 12, 2018, and a continuation-in-part of application No. 16/005,134, filed on Jun. 11, 2018, and a continuation-in-part of application No. 16/005,281, filed on Jun. 11, 2018, and a continuation-in-part of application No. 16/005,040, filed on Jun. 11, 2018.

(60) Provisional application No. 62/540,266, filed on Aug. 2, 2017, provisional application No. 62/540,326, filed on Aug. 2, 2017, provisional application No. 62/540,307, filed on Aug. 2, 2017, provisional application No. 62/518,337, filed on Jun. 12, 2017, provisional application No. 62/518,281, filed on Jun. 12, 2017, provisional application No. 62/518,371, filed on Jun. 12, 2017.

(51) Int. Cl.
*G06F 21/76* (2013.01)
*G06F 12/14* (2006.01)
*H04L 9/08* (2006.01)

(52) U.S. Cl.
CPC .............. *H04L 9/0894* (2013.01); *H04L 9/12* (2013.01); *H04L 63/0428* (2013.01); *G06F 2211/008* (2013.01)

(56) References Cited

U.S. PATENT DOCUMENTS

| | | | |
|---|---|---|---|
| 4,665,396 A * | 5/1987 | Dieleman | G06Q 20/341 235/382 |
| 5,363,477 A | 11/1994 | Kuragano et al. | |
| 5,446,880 A * | 8/1995 | Balgeman | G06F 17/30569 |
| 5,825,890 A | 10/1998 | Elgamal et al. | |
| 6,157,722 A | 12/2000 | Lerner et al. | |
| 6,466,780 B1 | 10/2002 | Geiselman et al. | |
| 6,766,161 B2 | 7/2004 | Geiselman et al. | |
| 6,917,974 B1 * | 7/2005 | Stytz | H04L 63/04 709/225 |
| 6,959,086 B2 | 10/2005 | Ober et al. | |
| 6,996,723 B1 * | 2/2006 | Kyojima | H04L 9/0822 380/45 |
| 7,032,240 B1 * | 4/2006 | Cronce | G06F 21/34 705/51 |
| 7,181,016 B2 | 2/2007 | Cross et al. | |
| 7,382,883 B2 | 6/2008 | Cross et al. | |
| 7,660,422 B2 * | 2/2010 | Mitchell | H04L 9/083 380/277 |
| 8,462,955 B2 | 6/2013 | Ureche et al. | |
| 8,825,999 B2 | 9/2014 | Mohamed | |
| 9,094,191 B2 | 7/2015 | Avanzi et al. | |
| 9,213,858 B2 | 12/2015 | Sharma et al. | |
| 9,465,953 B2 | 10/2016 | Shasrma et al. | |
| 9,521,123 B2 | 12/2016 | Jueneman et al. | |
| 9,703,985 B1 | 7/2017 | Sanchez | |
| 2002/0124177 A1 * | 9/2002 | Harper | G06F 21/6245 713/189 |
| 2004/0022222 A1 * | 2/2004 | Clisham | H04L 69/18 370/338 |
| 2005/0047600 A1 * | 3/2005 | Newkirk | H04W 12/04 380/278 |
| 2005/0069139 A1 * | 3/2005 | Higurashi | G06F 21/10 380/284 |
| 2005/0201564 A1 * | 9/2005 | Kayashima | H04L 9/0891 380/283 |
| 2006/0233371 A1 * | 10/2006 | Sowa | H04L 9/0822 380/248 |
| 2006/0258296 A1 * | 11/2006 | Steer | G01S 7/021 455/67.13 |
| 2007/0199071 A1 | 8/2007 | Callas | |
| 2012/0198538 A1 | 8/2012 | Spring et al. | |
| 2012/0314867 A1 * | 12/2012 | Tomaru | H04L 9/08 380/270 |
| 2015/0195089 A1 * | 7/2015 | Yajima | H04L 9/0869 380/46 |
| 2017/0012642 A1 | 1/2017 | Declercq et al. | |
| 2017/0140175 A1 * | 5/2017 | Angus | G06F 21/602 |

OTHER PUBLICATIONS

Papadimitratos et al.; Secure data communication in mobile ad hoc networks; Published in: IEEE Journal on Selected Areas in Communications ( vol. 24, Issue: 2, Feb. 2006 ); pp. 343-356; IEEE Xplore (Year: 2006).*

Russ, Eran. International Search Report. Israel Patent Office. dated Aug. 30, 2018, Jerusalem, Israel.

Russ, Eran. Written Opinion of the International Searching Authority. Israel Patent Office. dated Aug. 30, 2018, Jerusalem, Israel.

* cited by examiner

EXECUTABLE CODED CIPHER KEYS

PRIORITY STATEMENT

This application is a nonprovisional conversion of and takes priority under 119(e) of U.S. Provisional Application No. 62/540,326 filed Aug. 2, 2017 and entitled, "Executable Coded Cipher Keys".

This application is also a continuation-in-part of U.S. Nonprovisional application Ser. No. 16/005,918 Filed Jun. 12, 2018 and entitled "Devices for Transmitting and Communicating Randomized Data Utilizing Sub-Channels", which is a nonprovisional conversion of U.S. Provisional Application No. 62/540,307 filed Aug. 2, 2017 and entitled, "Devices for Transmitting and Communicating Randomized Encrypted Data Utilizing Sub-Channels".

This application is also a Continuation-in-part of U.S. Nonprovisional application Ser. No. 16/005,871 Filed Jun. 12, 2018 and entitled, "Devices that Utilize Random Tokens Which Direct Dynamic Random Access," which is a nonprovisional conversion of U.S. Provisional Application No. 62/540,266, filed Aug. 2, 2017 and entitled, "Selectable Key and Key Locator for A Hidden Dynamic Random Access Encryption System".

This application is also a continuation-in-part of U.S. Nonprovisional application Ser. No. 16/005,281 filed Jun. 11, 2018 and entitled, "User-Wearable Secured Devices Provided Assuring Authentication and Validation of Data Storage and Transmission", which is a nonprovisional conversion of 62/518,371, filed Jun. 12, 2017 and entitled, "User-Wearable Secured Devices Provided with Encryption Assuring Authentication and validation of Data Storage and Transmission".

This application is also a continuation-in-part of U.S. Nonprovisional application Ser. No. 16/005,134 filed Jun. 11, 2018 and entitled "Securitization of Temporal Digital Communications Via Authentication and Validation for Wireless User and Access Devices" which is a nonprovisional conversion of US Provisional Application entitled "Securitizing Temporal Digital Communications Via Authentication and Validation for Wireless User and Access Devices" with Ser. No. 62/519,337, filed Jun. 12, 2017.

This application is also a continuation-in-part of U.S. Nonprovisional application Ser. No. 16/005,040, filed Jun. 11, 2018 and entitled "Securitization of Temporal Digital Communications with Authentication and Validation of User and Access Devices", which is a nonprovisional conversion of US Provisional Application entitled "A System for Securing and Encrypting Temporal Digital Communications with Authentication and Validation of User and Access Devices" with Ser. No. 62/518,281 filed Jun. 12, 2017.

FIELD OF INVENTION

The technical field comprises cyber security. More specifically, the present disclosure relates to securitization of communications, and more particularly to devices and an associated system that conceals and reveals signals between devices to ensure that the communications are discoverable by only designated third parties. Methods and devices for securitization of these (primarily digital and normally two-way) communications using applications that may be combined with authorization and validation for receiving, storing, and retrieval of electronic, optical, and/or electro-optical communications in the form of voice, data, or optical transmissions, are also included.

The present disclosure includes devices and a key management system that is specifically suited for data transmission applications that require a need for discrete communications, preserving privacy of information, electronic commerce transactions, electronic mail communications and the like. The devices may be virtual or real devices as they may exist only in a CPU/computer or in computer memory.

BACKGROUND

As it is known in cryptology, encryption techniques (codification) using standard and evolving algorithms are used so that data exposed to undesirable third parties are encrypted making it difficult (and intended to be impossible) for an unauthorized third party to see or use it. Usually, for encryption, the term 'plaintext' refers to a text which has not been coded or encrypted. In most cases the plaintext is usually directly readable, and the terms 'cipher-text' or 'encrypted text' are used to refer to text that has been coded or "encrypted". Encryption experts also assert that, despite the name, "plaintext", the word is also synonymous with textual data and binary data, both in data file and computer file form. The term "plaintext" also refers to serial data transferred, for example, from a communication system such as a satellite, telephone or electronic mail system. Terms such as 'encryption' and 'enciphering', 'encrypted' and 'ciphered', 'encrypting device' and 'ciphering device', 'decrypting device' and 'decipher device' have an equivalent meaning within cryptology and are herein used to describe devices and methods that include encryption and decryption techniques.

There is an increasing need for security in communications over public and private networks. The expanding popularity of the Internet, and especially the World Wide Web, have lured many more people and businesses into the realm of network communications. There has been a concomitant rapid growth in the transmission of confidential information over these networks. As a consequence, there is a critical need for improved approaches to ensuring the confidentiality of private information.

Network security is a burgeoning field. There are well known encryption algorithms, authentication techniques and integrity checking mechanisms which serve as the foundation for today's secure communications. For example, public key encryption techniques using RSA and Diffie-Hellman are widely used. Well known public key encryption techniques generally described in the following U.S. Pat. No. 4,200,770 entitled, Cryptographic Apparatus and Method, invented by Hellman, Diffie and Merkle; U.S. Pat. No. 4,218,582 entitled, Public Key Cryptographic Apparatus and Method, invented by Hellman and Merkle; U.S. Pat. No. 4,405,829 entitled Cryptographic Communications System and Method, invented by Rivest, Shamir and Adleman; and U.S. Pat. No. 4,424,414 entitled, Exponentiation Cryptographic Apparatus and Method, invented by Hellman and Pohlig. For a general discussion of network security, refer to Network and Internetwork Security, by William Stallings, Prentice Hall, Inc., 1995.

In spite of the great strides that have been made in network security, there still is a need for further improvement. For example, with the proliferation of heterogeneous network environments in which different host computers use different operating system platforms, there is an increasing need for a security mechanism that is platform independent. Moreover, with the increasing sophistication and variety of application programs that seek access to a wide range of information over networks, there is an increasing need for a security mechanism that can work with many different types of applications that request a wide variety of different types of information from a wide variety of different types of server applications. Furthermore, as security becomes more important and the volume of confidential network transactions expands, it becomes increasingly important to ensure that security can be achieved efficiently, with minimal time and effort.

The creation of proprietary digital information is arguably the most valuable intellectual asset developed, shared, and traded among individuals, businesses, institutions, and countries today. This information is mostly defined in electronic digital formats, e.g., alphanumeric, audio, video, photographic, scanned image, etc. It is well known that a large number of encryption schemes have been used for at least the last 100 years and deployed more frequently since the onset of World Wars I and II. Since the beginning of the cold war, the "cat and mouse" spy missions have further promulgated the need for secure encryption devices and associated systems.

Simultaneously, there has been an increased need for mobility of transmissions including data and signals by physical or logical transport between home and office, or from office to office(s) among designated recipients. The dramatic increase in the velocity of business transactions and the fusion of business, home, and travel environments has accelerated sharing of this proprietary commercial, government, and military digital information. To facilitate sharing and mobility, large amounts of valuable information may be stored on a variety of portable storage devices (e.g., memory cards, memory sticks, flash drives, optical and hard disc magnetic media) and moved among home and office PCs, portable laptops, PDAs and cell phones, and data and video players and recorders. The physical mobility of these storage devices makes them vulnerable to theft, capture, loss, and possible misuse. Indeed, the storage capacity of such portable storage devices is now approaching a terabyte, sufficient to capture an entire computer operating environment and associated data. This would permit copying a targeted computer on the storage media and replicating the entire data environment on an unauthorized "virgin" computer or host device.

Another trend in data mobility is to upload and download data on demand over a network, so that the most recent version of the data is always accessible and can be shared only with authorized users. This facilitates the use of "thin client" software and minimizes the cost of storing replicated versions of the data, facilitates the implementation of a common backup and long-term storage retention and/or purging plan, and may provide enhanced visibility and auditing as to who accessed the data and the time of access, as may be required for regulatory compliance. However, thin client software greatly increases the vulnerability of such data to hackers who are able to penetrate the firewalls and other mechanisms, unless the data is encrypted on the storage medium in such a way that only authorized users could make sense of it, even if an unauthorized user were able to access the encrypted files.

There is a balance among legal, economic, national security, and pragmatic motivations to develop robust security implementations and policies to protect the storage of proprietary digital information, based on the value of the information, the consequences of its exposure or theft, and the identification and trust associated with each of the targeted recipients. In order to provide such varying degrees of protection for portable storage devices, system methods and application functionality must be developed and easily integrated into the operating procedures of the relevant institutions. Different policies defining degrees of protection are required to economically accommodate and adapt to a wide range of targeted recipient audiences for this data.

Known encryption systems for these devices include the "Data Encryption Standard" ("DES"), which was initially standardized by the "American National Bureau of Standards", currently "National Institute of Standards and Technology" ("NB S" or "NIST") in the United States. Another includes the "Fast data encipherment algorithm FEAL" (FEAL) developed later in Japan, and described in the IECEJ Technical Report IT 86-33. U.S. Pat. No. 5,214,703 entitled "Device for the Conversion of a Digital Block and Use of Same" describes the use of additional devices as does an encryption device described in U.S. Pat. No. 5,675,653 entitled "Method and Apparatus for Digital Encryption". In most cases, the user making use of protecting the data after encryption or enciphering of a plaintext has delegated the strength of the invulnerability of the encryption to be positioned in front of an enemy attack. This positioning is aimed to discover the contents of the cipher text or the encryption key used, trusting in the organizations, institutions, or experts endorsing their security and providing a degree of confusion and diffusion of values introduced by the encryption device used in the cipher text. The user encrypting a particular plaintext has no objective security regarding the degree of confusion and diffusion of values present in a cipher text that result from the application of the encryption device. Attacks on personal computers and commercial, government and military data are now commonplace; indeed, identity theft of passwords is the largest white-collar crime in the United States. Yet passwords and PINs (Personal Identification Numbers), in most cases generated by human beings who are tempted to use native-language words, Social Security Numbers, telephone numbers, etc., are still the most used access security methods for protecting portable encryption devices, and among the most vulnerable to both brute force dictionary attacks as well as sophisticated logic tracing. Professional criminal attackers and even amateur hackers now have access to sophisticated software and supercomputing networks that can unknowingly invade processing devices and storage devices, trace software instruction sequences and memory locations, and by knowing or discovering the algorithms being used, intercept and copy encryption keys, PINs, and other profile data used to protect the access to stored content. They can exploit vulnerabilities in the underlying commercial software, or in the construction of the integrated circuit chips housing and executing the cryptographic processes, or in the specialized cryptographic software, which enables exposing keys and access parameters at some deterministic point in the processing sequence. Industrial laboratory facilities are also available to read the data content stored in memory cells by measuring the electronic charge through the use of electronic beam microscopes, and thus steal stored PINs, keys, and therefore access the previously protected data.

Many prior art methods exist for the key management protection necessary for securing key encryption keys for large groups of users. Split-key secret sharing schemes have been proposed whereby the decryption key is split and shared among multiple parties or entities to be combined to reconstitute the decryption key. In these cases, however, the individual secret shares themselves are maintained statically in multiple storage devices, generally on-line, where they are susceptible to attackers, particularly from within the institution, who can target the secret shares and recombine then to form the decryption key. Such solutions are often implemented for relatively static configurations of computing and storage devices and related communities of interest or tiers of users, and have not addressed the ability to so protect key encrypting keys when the data itself, and the means to encrypt and decrypt the data and to generate and recombine the shared secrets, are on a portable device.

Current file encryption systems provide a technique for a general-purpose computer to encrypt or decrypt computer-based files. Current encryption and decryption techniques typically rely on lengthy strings (e.g., 1024 bits, 2048 bits, 4096 bits, or more) to provide for secure encryption or decryption of files. Computer performance suffers due to the amount of data in the messages as well as the size of the encryption keys themselves.

Asymmetric file encryption systems use a different key to encrypt a file from the key used to decrypt the encrypted file. Many current file encryption systems rely on asymmetric encryption, such as those that rely on public key/private key pairs. An example of an encryption algorithm that utilizes public key/private key pairs is the RSA (Rivest, Shamir, and Adleman) algorithm. Symmetric file systems use an identical key to encrypt a file as the key used to decrypt the encrypted file. Certain file encryption systems utilize a cryptographic process or random number generator to derive a random symmetric key known as the file encryption key (FEK). The FEK is used to encrypt the file. Symmetric cryptography functions up to five orders of magnitude faster than asymmetric cryptography on files. Even with a very fast key device or software that encrypts/decrypts using the asymmetric key, any such file encryption system still has to overcome the fact that asymmetric keys generally operate at orders of magnitude slower than symmetric keys. When using the file encryption key, each time a file is being authenticated, the file encryption key has to be decrypted by the asymmetric key which is time consuming, but becoming less so as computer speeds and operations are constantly improving.

What is needed are highly robust and proven security techniques incorporated into new system methods and into new commercially available portable storage hardware apparatus to implement configurable security policies for accessing information through rigorous authentication means, to secure the information with certified levels of accepted cryptographic technology, and to rigorously control the environment within which the information is shared.

In addition, there is a need to better secure portable storage apparatus and method of encrypting and sealing digital information files and storing them in the device's integral or removable memory, or alternatively on the host device's memory or other ancillary memory storage devices, while operating under cryptographically protected security policies for transport and authorized access to such digital information.

There is also a need for secure physical and logical transport of data to and from multiple recipients. To this end, it is desirable to provide a means of securely transporting data from one place to another, if the user has to carry the data or physically transport the data and the secure encryption device, and somehow communicate the information necessary to log on and access the data by another authorized user. What is required are a multiplicity of methods to securely transport the encrypted data, either physically or logically, between an Originator user and one or more Receivers.

The use of encryption devices by the general population is becoming very common in for example, commercial electronic transactions and/or electronic mail. A predominant portion of all societies want to believe in an objective, easily verified way, that the maximum degree of the diffusion and confusion (encryption) of data and data values provided by a system they are using to encrypt their data, is the superior set of encrypted devices and system.

These encrypted and decrypted data and data communications require special encryption keys essential to denying fraudulent or otherwise unauthorized third parties with the ability to access sealed encrypted transmissions for data at rest as well as for data on the move.

The present disclosure relates generally to a cryptographic management scheme that provides for network security, mobile security and specifically and more particularly relates to devices and a system for creating and manipulating encryption keys without risking the security of the key. The present disclosure addresses all of the needs described directly herein, as well as described earlier above.

Executable Coded Keys

In response to the discussion above, in the present disclosure, the executable coded keys themselves contain code which can perform a portion or all of the encryption. These executable coded keys can be equivalent to binary bits. They can be inserted into execution memory and provide instructions to the computer to execute the code. In order for the system to operate property with the encrypter and decrypter devices, the CPU must be designed specifically to ensure it can accommodate binary codes to carry out encryption/decryption duties. These include performing both reversible and non-reversible mathematic operations such as inverts, shifts with rotations, call functions, etc.

For non-reversible operations, all of the functions that have two (2) separate inputs and one output, for example multiplication, division, addition, and subtraction (non-reversible by definition), there are an infinite number of possibilities of how, for example, (a)+(b) arrives at the output (c). So, the encryption all depends on reversibility. In some cases this means simple coding in the form of "letter for number swapping". The point is that the process of decrypting does not necessarily lead to one specific result. To reverse addition, for example, one must perform subtraction, but does not automatically know anything with regard to the original equation that was utilized. In this manner, there is no ideal reversible method to go backwards. One method often employed is that of "brute force" or "fake the addition function" by inferring knowledge of a or b. The a and b may be "buried" somewhere in the algorithm. It is possible to hide the fact that one of those 2 numbers (a orb) is in the algorithm, so you can find the number sum, which then allows, for example, reversible addition. This is in essence how public/private key pairs actually work and in the case of the present invention, these keys are encrypted and codeable.

The implications are important in that here we are removing encryption code from the execution memory (library) and placing the execution code in the encryption key—thus the term executable coded cipher keys applies. The keys can be indirectly accessed as an I/O device as well, which establishes the fact that the key is part of the encrypting key program. As with any public/private key arrangement, the keys remain secret or hidden from any third party, and the keys in this instant are dynamic. Therefore, if a third party has access to the source code, they cannot decrypt the data because at least a portion of the source code that was used to decrypt the data is unavailable. In other words, part of the source code is binary code that resides in the key.

To pre-encrypt and/or post-encrypt the data using our techniques, the data is encrypted or after it is encrypted using AES (or some other recognized standard form of encryption) renders all AES algorithms essentially useless. Another way to understand the present disclosure and associated inventiveness is that encrypters/decrypters and their associated system presented herein, enhances all AES or other standardized security systems using our encryption/decryption techniques and algorithms if added to the AES standards.

In most cases, the algorithms described are synonymous with computerized computations.

In addition, the functionality of the CPU, as described below, could be provided by an analogue computational mechanism utilizing, for example, optical, thermal, radiative and/or electromagnetic circuitry. For these systems, the use of digital bits would most likely be replaced and provided, for instance, by some sequence of analogue modulators.

SUMMARY

More specifically the present disclosure describes two or more devices that encrypt transmission(s) transmitted to and/or decrypt transmission(s) received from the devices comprising; at least one executable coded cipher key(s), and at least one executable coded encryption key (ECEK) device that encrypts transmission(s) that uses executable cipher coded key(s), and at least one executable coded decryption key (ECDK) device that decrypts transmission(s) that also uses the at least one executable coded cipher key(s), at least one computer processing unit (CPU) with computational capabilities that is connected to and controls a computer memory via an address bus and a data bus such that the address bus accesses a designated range of computer memories and range of memory bits and the data bus provides for a flow of transmission(s) into and out of the CPU and computer memory, and wherein the computer memory contains encrypter/decrypter memory that possesses at least one encryption space location and at least one decryption space location for the executable coded cipher key(s), such that transmission(s) is sent to the encrypter/decrypter memory that stores the transmission(s) while the transmission(s) is encrypted and/or decrypted, and wherein, when encryption/decryption is completed, the transmission(s) is sent to at least one transmitter such that encryption/decryption of the transmission(s) is controlled and manipulated by executable coded cipher key(s), wherein the executable coded cipher key(s) remain in computer memory long enough to achieve encryption/decryption completion.

In this case, it is also possible that the ECEK and ECDK devices operate as a single device that when in operation as a single device provides the same functionality as if they operated as individual devices.

It is equally important to note that the ECEK and the ECDK devices each provide functions that allow for encryption and/or decryption.

Here, the ECEK and ECDK devices individually or in combination can create said executable coded cipher keys. These devices can be real and/or virtual devices. Gate arrays can provide the necessary functionality in lieu of or together with the CPU. Here, the gate arrays can be programmable gate arrays.

In a further embodiment, the executable coded cipher key(s) are removed from memory after one or more encryption/decryption functions are performed with the key(s). The executable coded cipher key(s) can be automatically removed from a location where said key(s) reside.

In addition, the executable coded cipher key(s) provide executable code that controls encryption/decryption processes within the key(s) in lieu of within a CPU and/or the CPU memory.

In all cases, the transmission(s) and transmission(s) devices can be data and data devices as well as transmission(s) and transmission(s) devices that can be signals and signal devices and/or a combination of signals and transmissions. The transmission(s) can also be provided with and contain noise and/or a form of illogical randomness.

In the present disclosure, data at rest is implemented by utilizing a memory storage device in lieu of an unsecured network, where the data at rest can reside.

The executable coded cipher keys exist within virtual or real input/output (I/O) devices.

In addition, the executable coded cipher keys are capable of containing binary randomized bits that are interpreted by one or more encrypt/decrypt binary primitive interpreters. The interpreters dispatch control to a remaining balance of binary primitive subroutine libraries, wherein the primitive subroutine libraries are chosen functions that provide instructions to encrypt and/or decrypt data in encrypt/decrypt memory. The encryption includes an encryption set of primitives utilized by bits in executable coded cipher keys that produce encryption functions and wherein decryption includes a decryption set of primitives that utilizes the bits found in the executable coded cipher keys. These executable coded cipher keys provide matching but inverse functions that are required to decrypt the data, such that the decryption bits obtained from the executable coded cipher keys are utilized in a reverse order when compared with those utilized for encryption.

In a related embodiment, computer memory contains the encrypter/decrypter memory with one encryption space location and one decryption space location so that the computer memory also may contain space location for the executable coded cipher keys and subroutine primitives.

The executable coded cipher keys can be divided into memory space locations and subroutine primitives can also be divided into memory space locations represented by and including encrypt/decrypt binary primitive interpreter(s) as well as an encryption set of primitives and a decryption set of primitives.

In a further embodiment, the data to be encrypted has been stored in an encryption space location and the encrypt/decrypt binary primitives interpreter(s) accesses a first portion of an executable coded cipher key and interprets bits to select an encryption set of a primitives library that reads, modifies, and writes the encryption space location. The encrypt/decrypt binary primitive interpreter then accesses a second portion of an executable coded cipher key and interprets bits to again select an encryption set of primitives library which will further read, modify, and write the encryption space location such that a stepwise process continues and utilizes some or all portions of the executable coded cipher key, that results in completing the encryption.

For data to be decrypted, the data can be stored in a decryption space location and the encrypt/decrypt binary primitives interpreter(s) accesses a last portion of an executable coded cipher key and interprets bits to select a decryption primitives library which will read, modify, and write the decryption space location. The binary primitive interpreter(s) then accesses a next to last portion of an executable coded cipher key and interprets bits to further select from the decryption primitives library to further read, modify, and write the decryption space location such that a stepwise process continues and utilizes some or all portions of an executable coded cipher key(s) in reverse order of the encryption that results in completing the decryption.

In several embodiments, the executable coded cipher keys are place into divided memory space locations and the encrypt/decrypt binary primitive interpreter is found within the executable coded cipher key(s). It is also true that in some instances, the encryption and decryption primitives can be found within the executable coded cipher key(s).

When or if there is an absence of executable code, it is possible for the CPU and CPU memory to directly access the executable coded cipher key(s) for encryption and decryption instructions.

In further embodiments, the executable coded cipher key(s) can be stored in computer memory. It is also possible that the executable coded cipher key(s) be stored in a form of crypto memory. In addition, the executable coded cipher key(s) can themselves operate as a virtual CPU. Further, the executable coded cipher key(s) may operate as virtual hardware that includes one or more virtual CPUs.

In all the embodiments presented it is also useful to employ a system with two or more devices that encrypt transmission(s) transmitted to and/or decrypt transmission(s) received from the system comprising at least one executable coded encryption key(s), and at least one executable coded encryption key (ECEK) device that encrypts transmission(s) that uses executable coded cipher key(s), and at least one executable coded decryption key (ECDK) device that decrypts transmission(s) that also uses at least one executable coded encryption key(s), at least one computer processing unit (CPU) with computational capabilities that is connected to and controls a computer memory via an address bus and a data bus such that the address bus accesses a designated range of computer memories and range of memory bits and allows for the data bus to provide for a flow of transmission(s) into and out of the CPU and computer memory. The computer memory in this instance, contains encrypter/decrypter memory that possesses at least one encryption space location and at least one decryption space location for executable coded cipher key(s), such that transmission(s) is sent to the encrypter/decrypter memory that stores the transmission(s) while said transmission(s) is encrypted and/or decrypted. When encryption/decryption is completed, the transmission(s) is sent to at least one transmitter such that encryption/decryption of the transmission(s) is controlled and manipulated by executable coded cipher key(s), wherein the executable coded cipher key(s) remain in the computer memory long enough to achieve encryption/decryption completion.

DETAILED DESCRIPTION

So that the above recited features and advantages of the present disclosure can be understood in detail, a more particular description of the invention and reference to embodiments are provided and illustrated in the appended figures. It is to be noted, however, that the appended drawings illustrate only typical embodiments of the present disclosure and are therefore not to be considered limiting the scope or other equally effective embodiments.

Figure 1:
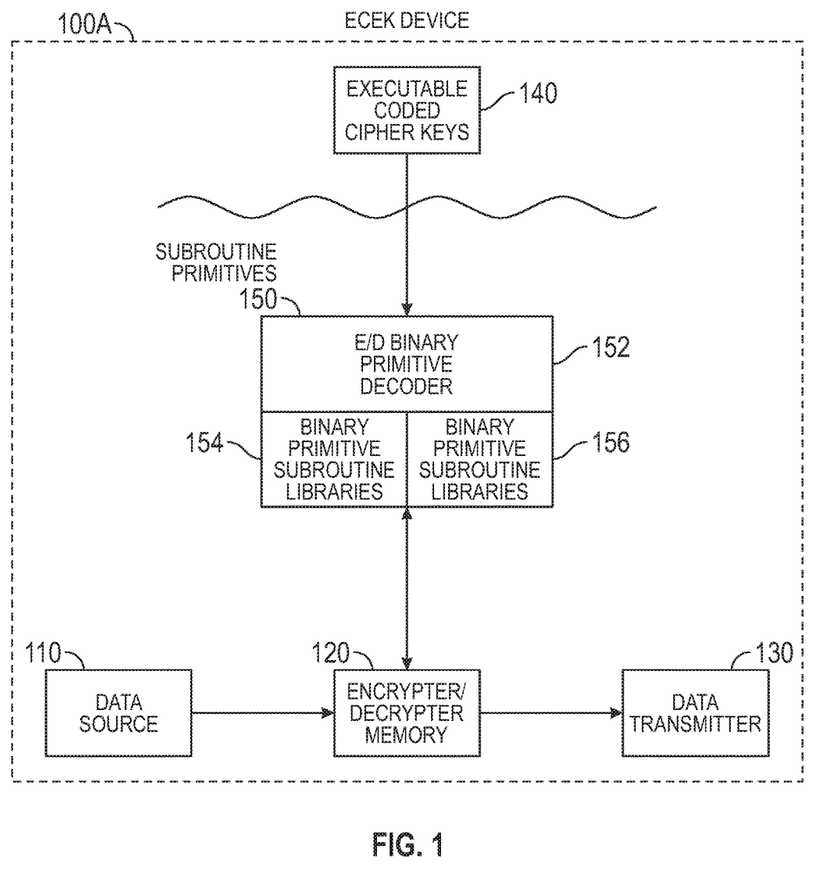
FIG. 1 is a flowchart describing the structure and functionality of a device that uses an executable coded encryption key, an ECEK device that encrypts and/or decrypts data using executable coded cipher keys.

FIG. 1 is a flowchart (100) describing a device that uses an executable coded encryption key, an ECEK device, (100A) that encrypts and/or decrypts data using executable coded cipher keys (140). Beginning with a data source (110) which could be plaintext, the data is sent to an encrypter/decrypter memory (120) which stores the data while it is being encrypted and/or decrypted. When the encryption/decryption is completed the data is sent to a data transmitter (130). The process of encryption/decryption is controlled by the executable coded cipher keys (140). The executable coded cipher keys (140) need only remain in computer memory for at least the duration of the encryption/decryption process. Executable coded cipher keys (140) control the execution of encryption/decryption subroutine primitives (150). The subroutine primitives (150) read, modify, and write the encrypter/decrypter memory (120). This allows for the executable coded cipher keys (140) to control the encryption/decryption process of reading, modifying, and writing the encrypter/decrypter memory (120) by utilizing the subroutine primitives (150). This allows for the executable coded cipher keys (140) to be removed from a computer memory (not shown), as computer memory no longer contains instructions to encrypt and/or decrypt the data residing in the encrypter/decrypter memory (120). As a result, it is impossible to reverse compile the code because the code no longer resides in computer memory. In addition, it is impossible to steal or copy the coded keys (140) because they also no longer reside in computer memory. In the present disclosure, the encryption/decryption instructions reside in the key itself, for which no source code exists, i.e., there is no source code for the key.

The executable coded cipher keys (140) simply contain the typical binary randomized bits that are the same or similar to those contained in today's symmetric encryption keys. These bits may be interpreted by the encrypt/decrypt binary primitive interpreter (152) which then dispatches control to the balance of the binary primitive subroutine libraries (154, 156). The binary primitive subroutine libraries (154, 156) are chosen functions which provide instructions to encrypt or decrypt the data in encrypt/decrypt memory (120). While encrypting, the encryption set of primitives (154) are utilized by bits in executable coded cipher keys (140) to produce encryption functions. While decrypting, a decryption set of primitives (156), utilizes the same bits found in the executable coded cipher keys (140) which provide matching but inverse functions that are required to decrypt the data. For decryption, the bits used from the executable coded cipher keys (140) are utilized in a reverse order when compared with those utilized during and for encryption.

Figure 2:
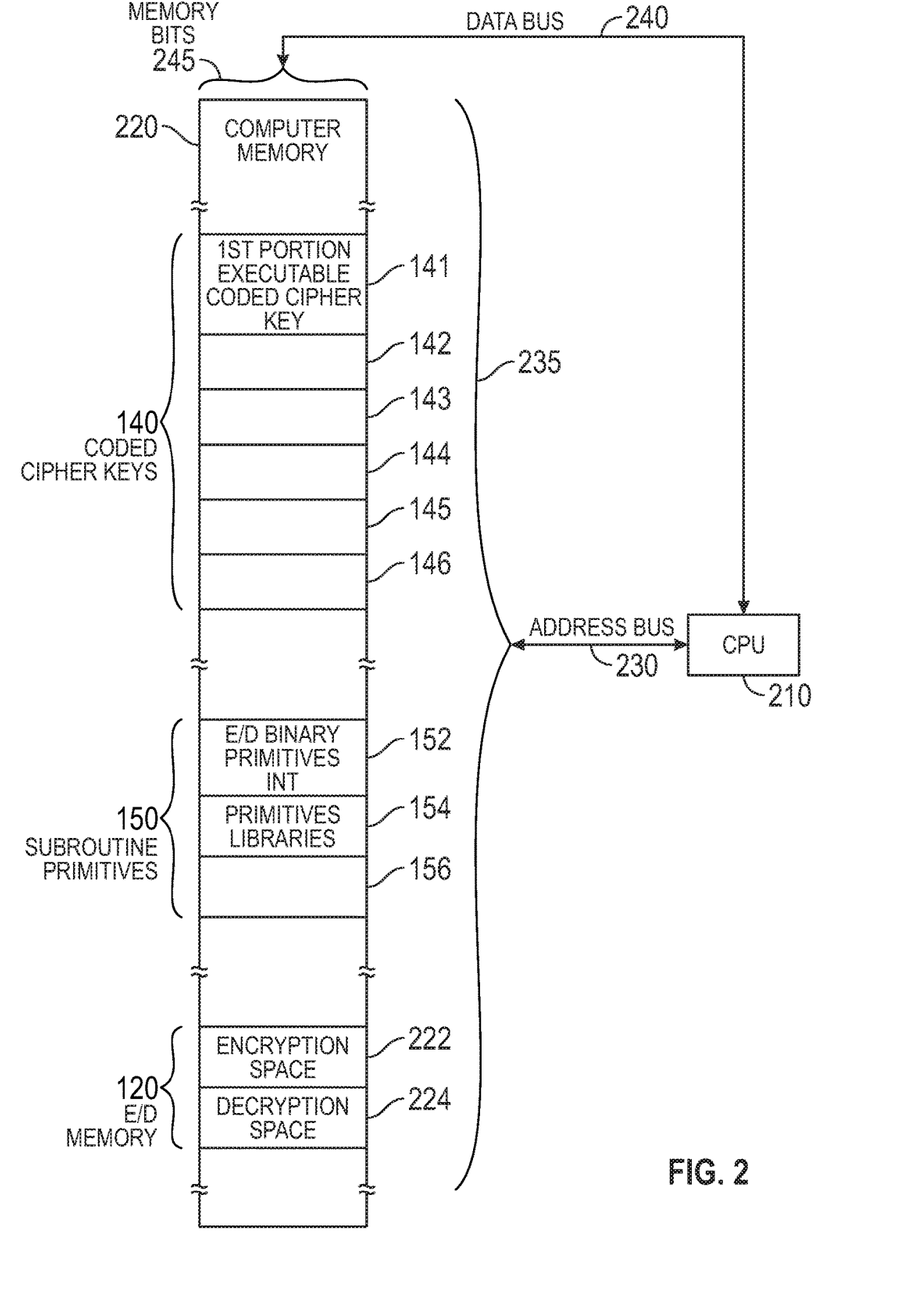
FIG. 2 is a flowchart describing the structure and functionality of a device that uses an executable coded decryption key (ECDK) device that encrypts and/or decrypts data using executable coded cipher keys.

FIG. 2 is a flowchart (200) describing the structure and functionality of a device that uses an executable coded decryption key (ECDK) device, (200A) that encrypts and/or decrypts data using executable coded cipher keys (140). Computer processing unit (210) is connected to computer memory (220) through an address bus (230) and a data bus (240). The address bus (230) accesses a range of computer memory (235). The data bus (240) accesses a range of memory bits (245).

The computer memory (220) contains the encrypter/decrypter memory (120) with one encryption location (222) and one decryption location (224). The computer memory (220) also contains location for the executable coded cipher keys (140) and the subroutine primitives (150). The executable coded cipher keys are divided into memory locations (141, 142, 143, 144, 145, 146 . . . nnn) as required. The subroutine primitives (150) are divided into memory locations represented by and including the encrypt/decrypt binary primitive interpreter (152) as well as the encryption set of primitives (154), and decryption set of primitives (156).

During encryption, the data to be encrypted has been stored in encryption location (222). The encrypt/decrypt binary primitive interpreter (152) accesses the first portion of an executable coded cipher key (141) and interprets the bits to select the encryption set of primitives library (154) which will read, modify, and write the encryption location (222). The encrypt/decrypt binary primitive interpreter (152) accesses the second portion of an executable coded cipher key (142) and interprets the bits to select the encryption set of primitives library (154) which will read, modify, and write the encryption location (222). This stepwise process continues by utilizing all of the portions of the executable coded cipher key (140) which results in completing the encryption process.

During decryption, the data to be decrypted has been stored in decryption location (224). The encrypt/decrypt binary primitives interpreter (152) accesses the last portion of an executable coded cipher key (146) and interprets the bits to select the decryption primitives library (156) which will read, modify, and write the decryption location (224). The encrypt/decrypt binary primitives interpreter (152) accesses the next to last portion of an executable coded cipher key (145) and interprets the bits to select the decryption primitives library (156) which will read, modify, and write the decryption location (224). This stepwise process continues by utilizing all of the portions of the executable coded cipher keys (140) in the reverse order of the encryption process, which results in completing the decryption process.

Figure 3:
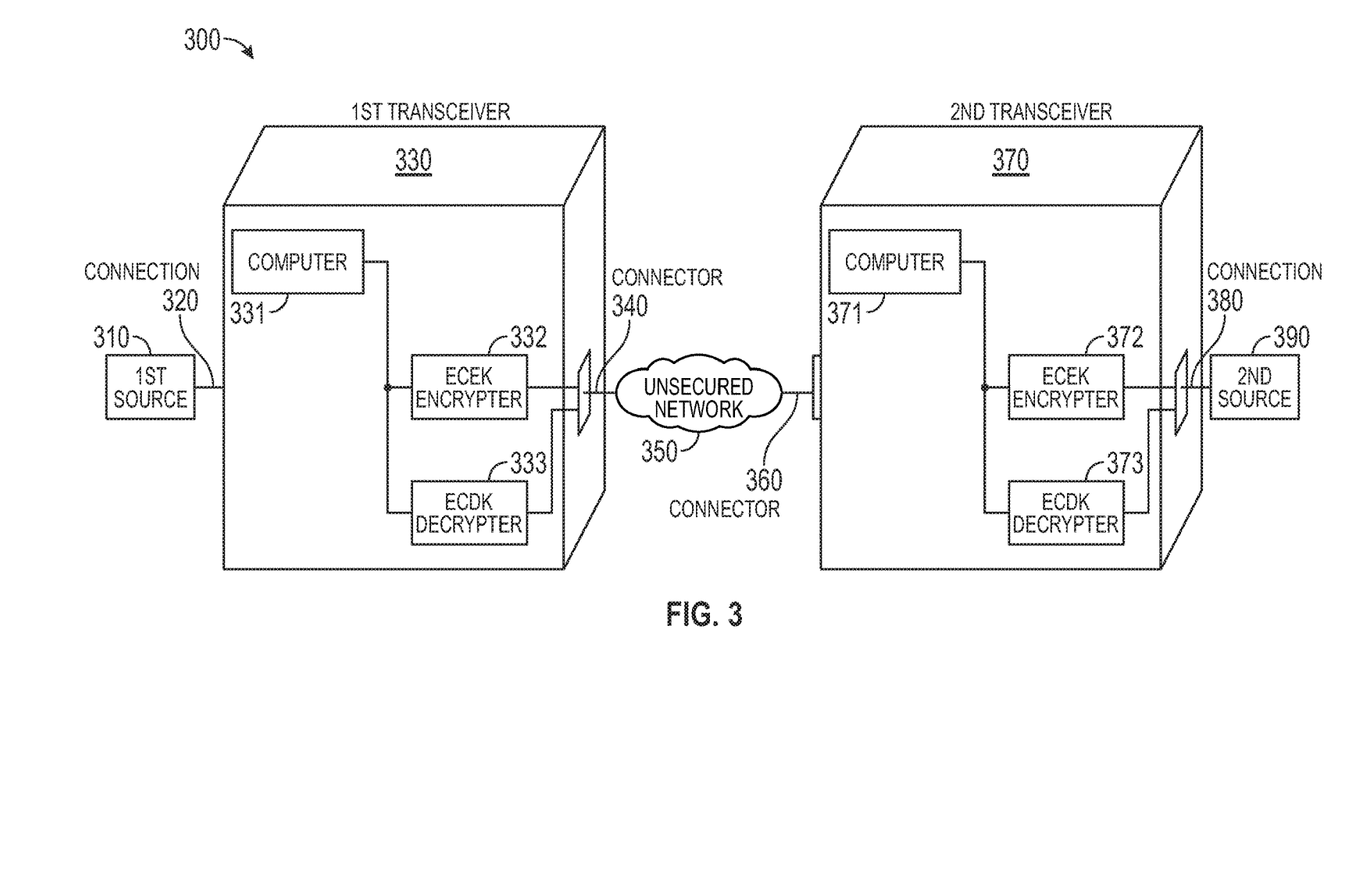
FIG. 3 is a schematic (300) depicting the combination of two transceiver devices utilizing both encrypters and decrypters which operate according to the randomized encryption and decryption of the present disclosure.

FIG. 3 is a schematic (300) depicting the combination of two transceiver devices utilizing both encrypters and decrypters. Communication signals from a first source (310) are sent through connection (320) to the first transceiver (330). The first transceiver (330) securely connects encrypted data through connection (340) through an unsecured network (350). The second transceiver (370) securely connects encrypted data through another connection (360) through the unsecured network (350). Communication signals from a second source (390) are sent through connection (380) to the second transceiver (370).

In order to secure communication signals from the first source (310) to the second source (390), the following process is required;

The signals (310) enter the first transceiver (330) through connection (320) and travel to the ECEK (332). The (ECEK) Encrypter (332) is controlled by the computer (331) to optionally encrypt and transmit the communication signals to the ECDK Decrypter (373) via an unsecured network (350). Encrypted signals arrive at the second transceiver (370) to the ECDK Decrypter (373) controlled by computer (371). ECDK Decrypter (373) decrypts the signals and sends them to the second source (390) thorough connection (380). This accomplishes sending secured signals from a first source (310) to a second source (390) by utilizing the optional encryption system which may be randomized, of the present disclosure. The communication signals can be conversely secured by sending them from the second source (390) to the first source (310) utilizing the ECEK (372) in the second transceiver (370) as well as the ECDK Decrypter (333) in the first transceiver (330). This completes the process for securing data in transit.

Figure 4:
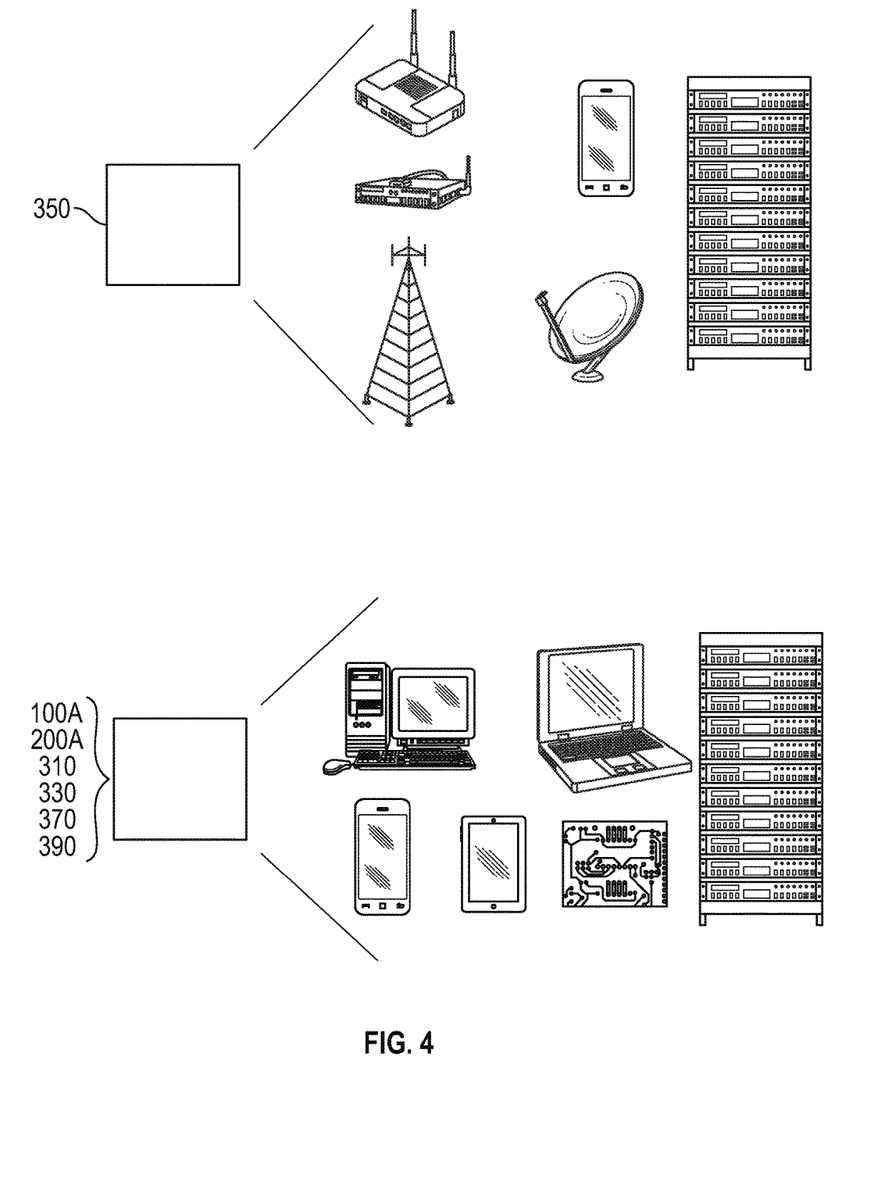
FIG. 4 is a schematic diagram that illustrates devices utilized initially represented in simple block form for FIGS. 1, 2, and 3.

FIG. 4 is a schematic diagram that illustrates devices utilized initially represented in simple block form for FIGS. 1, 2, and 3. More specifically, FIG. 4 further illustrates and demonstrates actual and various devices using exploded view callouts from that depicted in the schematic diagram shown as shown and described in FIGS. 1-3. For FIG. 3, item 350 primarily represents DASA databases. In addition the list of devices associated with callouts 100A, 200A, as well as 310, 330, 370, and 390 found in FIGS. 1-3) can also represent DASA database(s) as well as user devices and/or access devices including desktop or stand-alone computer terminals replete with hard drives, laptop computers, cellular or smart telephones, computer tablets such as the iPad®, computer mainframes, and even printed circuit boards or integrated circuits (ICs). Further, elaborating on the virtual user devices as described above, these can be created and are shown as real output device(s). It remains important to understand that these real devices can be used to create virtual user devices.

Further examples of "many to many" connections are also included herein as communication data connections from 350 to the list of 100A, 200A, as well as 310, 330, 370, and 390 devices. Data communication amplifiers, repeaters, and/or range extenders which optionally assist in ensuring signal integrity and strength, over various communication distances can be located in the data communication flow paths connecting the DASA databases, user devices, and/or access devices.

While most of the foregoing discussion about the present encryption technique has focused on the use of databases, lists and tables for storing transaction specific codes, it may be preferred in some applications having limited memory to provide an algorithm for calculating the next transaction specific code. The concept of "tolerance" described earlier may be incorporated either by setting an acceptable range of values for the transaction specific code (output of the algorithm) or the designated portion itself (input to the algorithm), the latter being the equivalent of back calculating the designated portion and verifying that it is within the range of tolerance.

The computer readable media described within this application is non-transitory. In most if not all cases, the transmission of data is transmitted via signals that are non-transitory signals.

In addition, each and every aspect of all references mentioned herein are hereby fully incorporated by reference.

In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments. While the foregoing is directed to preferred embodiments of the present invention, other and further embodiments of the invention may be devised without departing from the basic scope thereof, and the scope thereof is determined by the claims which follow.

I claim:

1. Two or more devices that encrypt transmission(s) transmitted to or decrypt transmission(s) received from or both encrypt transmission(s) transmitted to and decrypt transmission(s) received from said two or more devices comprising;
   at least one executable coded cipher key(s), where said at least one executable coded cipher key(s) contains executable code that performs a portion or all of an encryption or decryption sequence or both an encryption and decryption sequence, with said encryption and decryption sequences performed by encryption and decryption functions also contained within said at least one executable coded cipher key(s), in which said decryption function is a matching inverse function to that of said encryption function, and decryption bits obtained from said at least one executable coded cipher key(s) are utilized in a reverse order to that of encryption bits obtained from said at least one executable coded cipher key(s), and
   at least one executable coded encryption key (ECEK) device that encrypts transmission(s) by utilization of said at least one executable coded cipher key(s), and
   at least one executable coded decryption key (ECDK) device that decrypts transmission(s) by utilization of said at least one executable coded cipher key(s),
   at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and said computer memory,
   and wherein said computer memory contains encrypter/decrypter memory that possesses at least one encryption space location and at least one decryption space location for said executable coded cipher key(s),
   where transmission(s) is sent to said encrypter/decrypter memory that stores said transmission(s) while said transmission(s) is encrypted and/or decrypted,
   and wherein, when encryption/decryption is completed said transmission(s) is sent to at least one transmitter where encryption/decryption of said transmission(s) is controlled and manipulated by said executable coded cipher key(s), wherein said executable coded cipher key(s) remain in said computer memory in order to achieve encryption/decryption completion.

2. The two or more devices of claim 1, wherein said ECEK and said ECDK operate as a single device that when in operation as a single device provide the same functionality as if they operated as individual devices.

3. The two or more devices of claim 2, wherein said ECEK and said ECDK provide functions that allow for encryption and/or decryption.

4. The two or more devices of claim 3, wherein said ECEK and said ECDK individually or in combination creates said executable coded cipher keys.

5. The two or more devices of claim 1, wherein said two or more devices are real or virtual devices or both said real and said virtual devices.

6. The two or more devices of claim 1, wherein gate arrays provide necessary computational functionality that functions in lieu of or together with said (CPU) and wherein said gate arrays are programmable gate arrays.

7. The two or more devices of claim 1, wherein said executable coded cipher key(s) are removed from memory after one or more encryption/decryption functions are performed with said executable coded cipher key(s) and wherein said executable coded cipher key(s) are automatically removed from a location where said executable coded cipher key(s) reside.

8. The two or more devices of claim 1, wherein said executable coded cipher key(s) provide executable code that controls encryption/decryption processes within said executable coded cipher key(s) in lieu of within said CPU or said CPU memory or both said CPU and said CPU memory.

9. The two or more devices of claim 1, wherein all transmission(s) and transmission(s) devices are data and data devices respectively.

10. The two or more devices of claim 1, wherein all transmission(s) and transmission(s) devices are signals and signal devices respectively or a combination of signals and transmissions or both signals and signal devices respectively and a combination of signals and transmissions.

11. The two or more devices of claim 1, wherein said transmission(s) are provided with and contain noise or a form of illogical randomness or both noise and a form of illogical randomness.

12. The two or more devices of claim 1, wherein data at rest is implemented by utilizing a memory storage device in lieu of an unsecured network, where said data at rest can reside.

13. The two or more devices of claim 1, wherein said executable coded cipher keys exist within virtual or real input/output (I/O) devices and wherein said executable coded cipher keys contain binary randomized bits that are interpreted by one or more encrypt/decrypt binary primitive interpreters.

14. The two or more devices of claim 13, wherein said encrypt/decrypt binary primitive interpreters dispatch control to a remaining balance of binary primitive subroutine libraries, wherein said binary primitive subroutine libraries are chosen functions that provide instructions to encrypt and/or decrypt data in encrypt/decrypt memory.

15. The two or more devices of claim 1, wherein encryption includes an encryption set of primitives utilized by bits in said executable coded cipher keys that produce encryption functions and wherein decryption includes a decryption set of primitives that utilizes said bits that reside in said executable coded cipher keys.

16. The two or more devices of claim 15, wherein said executable coded cipher keys provide matching inverse functions that are required to decrypt said data, and wherein for decryption bits obtained from said executable coded cipher keys, said decryption bits are utilized in a reverse order when compared with those utilized for encryption.

17. The two or more devices of claim 1, wherein said computer memory contains encrypter/decrypter memory with one encryption space location and one decryption space location and wherein said computer memory also contains allocation space for said executable coded cipher keys and subroutine primitives.

18. The two or more devices of claim 17, wherein said executable coded cipher keys are divided into memory space locations and wherein said subroutine primitives are divided into memory space locations represented by and including encrypt/decrypt binary primitive interpreter(s) as well as an encryption set of primitives and a decryption set of primitives.

19. The two or more devices of claim 1, wherein data to be encrypted has been stored in an encryption space location and wherein an encrypt/decrypt binary primitives interpreter(s) accesses a first portion of an executable coded cipher key and interprets bits to select an encryption set of a primitives library that reads, modifies, and writes said encryption space location where said data to be encrypted has been stored.

20. The two or more devices of claim 19, wherein said encrypt/decrypt binary primitives interpreter(s) then accesses a second portion of said executable coded cipher key and interprets bits to again select an encryption set of primitives library that further reads, modifies, and writes said encryption space location where a stepwise process continues and utilizes some or all portions of said executable coded cipher key, that results in completing an encryption.

21. The two or more devices of claim 1, wherein data to be decrypted has been stored in a decryption space location and wherein an encrypt/decrypt binary primitives interpreter(s) accesses a last portion of an executable coded cipher key and interprets bits to select a decryption primitives library that reads, modifies, and writes said decryption space location where said data to be decrypted has been stored.

22. The two or more devices of claim 21, wherein said encrypt/decrypt binary primitives interpreter(s) then accesses a next to last portion of said executable coded cipher key and interprets bits to further select from said decryption primitives library to further read, modify, and write said decryption space location where a stepwise process continues and utilizes some or all portions of said executable coded cipher key(s) in reverse order of an encryption that results in completing a decryption.

23. The two or more devices of claim 1, wherein said executable coded cipher keys are placed into divided memory space locations.

24. The two or more devices of claim 1, wherein an encrypt/decrypt binary primitive interpreter is within said executable coded cipher key(s).

25. The two or more devices of claim 1, wherein encryption and decryption primitives are within said executable coded cipher key(s).

26. The two or more devices of claim 1, wherein there is an absence of executable code where said CPU and said computer memory directly accesses said executable coded cipher key(s) for encryption and decryption instructions.

27. The two or more devices of claim 1, wherein said executable coded cipher key(s) are stored in computer memory that is a form of crypto memory and wherein said executable coded cipher keys(s) operate as a virtual CPU.

28. A system with
two or more devices that encrypt transmission(s) transmitted to or decrypt transmission(s) received from or both encrypt transmission(s) transmitted to and decrypt transmission(s) received from said two or more devices comprising;
at least one executable coded cipher key(s), where said at least one executable coded cipher key(s) contains executable code that performs a portion or all of an encryption or decryption sequence or both an encryption and decryption sequence, with said encryption and decryption sequences performed by encryption and decryption functions also contained within said at least one executable coded cipher key(s), in which said decryption function is a matching inverse function to that of said encryption function, and decryption bits obtained from said at least one executable coded cipher key(s) are utilized in a reverse order to that of encryption bits obtained from said at least one executable coded cipher key(s), and
at least one executable coded encryption key (ECEK) device that encrypts transmission(s) by utilization of said at least one executable coded cipher key(s), and
at least one executable coded decryption key (ECDK) device that decrypts transmission(s) by utilization of said at least one executable coded cipher key(s),
at least one computer processing unit (CPU) with computational capabilities that is connected to and controls a computer memory via an address bus and a data bus where said address bus accesses a designated range of computer memories and range of memory bits and said data bus provides a flow of transmission(s) into and out of said CPU and said computer memory,
and wherein said computer memory contains encrypter/decrypter memory that possesses at least one encryption space location and at least one decryption space location for said executable coded cipher key(s),
where transmission(s) is sent to said encrypter/decrypter memory that stores said transmission(s) while said transmission(s) is encrypted and/or decrypted,
and wherein, when encryption/decryption is completed said transmission(s) is sent to at least one transmitter where encryption/decryption of said transmission(s) is controlled and manipulated by said executable coded cipher key(s), wherein said executable coded cipher key(s) remain in said computer memory in order to achieve encryption/decryption completion.

29. The system of claim 28, wherein encryption and decryption is performed with continuously changing keys that exist along data communication flow paths connecting distributed auto-synchronous array (DASA) databases.

* * * * *